No. 830,256. PATENTED SEPT. 4, 1906.
P. C. SMITH.
BREAD MIXER.
APPLICATION FILED OCT. 10, 1905.

2 SHEETS—SHEET 1.

WITNESSES:
L. B. Woerner
Wm Hurte

INVENTOR:
PERRY C. SMITH,
By Minturn & Woerner,
ATTORNEYS.

No. 830,256. PATENTED SEPT. 4, 1906.
P. C. SMITH.
BREAD MIXER.
APPLICATION FILED OCT. 10, 1905.
2 SHEETS—SHEET 2.
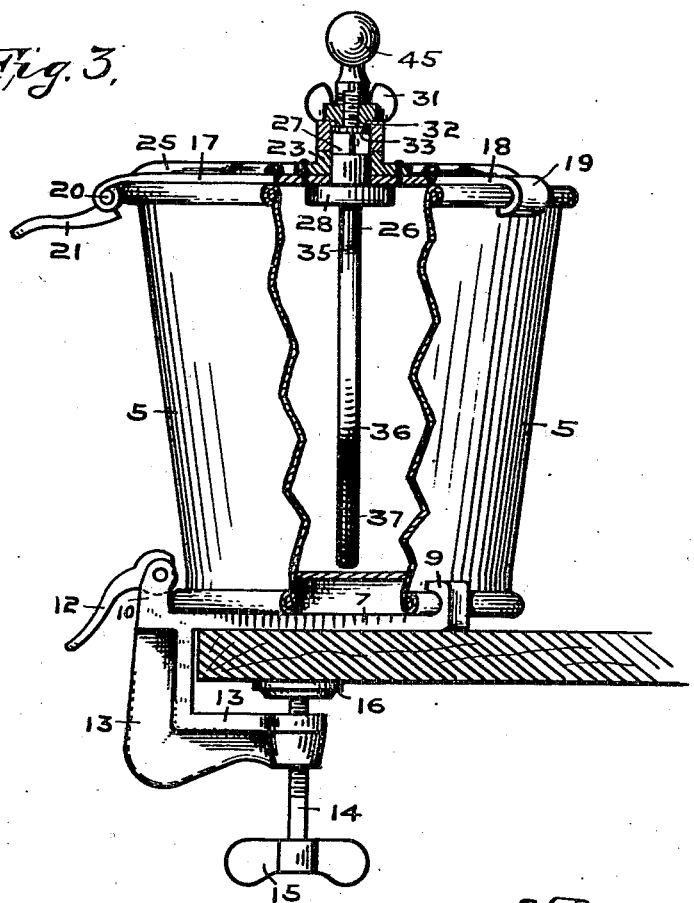
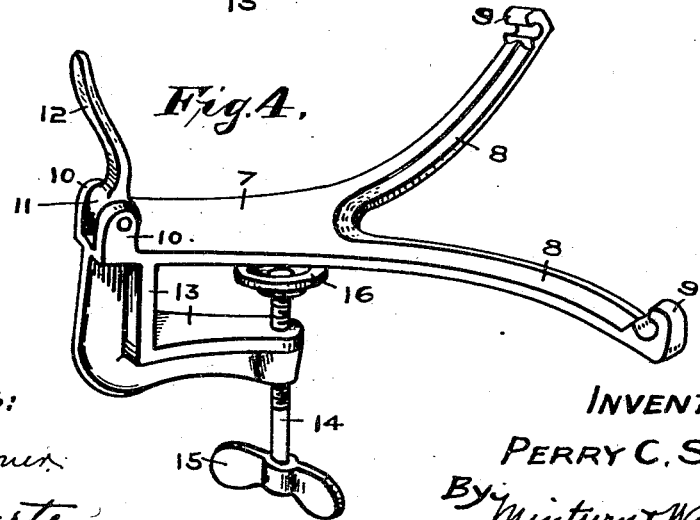
WITNESSES:
L. B. Woerner
Wm Hurte
INVENTOR:
PERRY C. SMITH,
By Minturn & Woerner,
ATTORNEYS.

UNITED STATES PATENT OFFICE.

PERRY C. SMITH, OF CHICAGO, ILLINOIS.

BREAD-MIXER.

No. 830,256.  Specification of Letters Patent.  Patented Sept. 4, 1906.

Application filed October 10, 1905. Serial No. 282,126.

*To all whom it may concern:*

Be it known that I, PERRY C. SMITH, a citizen of the United States, residing at Chicago, in the county of Cook and State of Illinois, have invented certain new and useful Improvements in Bread-Mixers, of which the following is a specification.

This invention relates to improvements in bread and other dough mixers; and the object of the invention is to provide a device which will be easy to put together and to take apart, which will be easy to operate, and which will be efficient and thorough in mixing together the ingredients of the dough.

I accomplish the objects of the invention by the mechanism illustrated in the accompanying drawings, in which—

Figure 1:
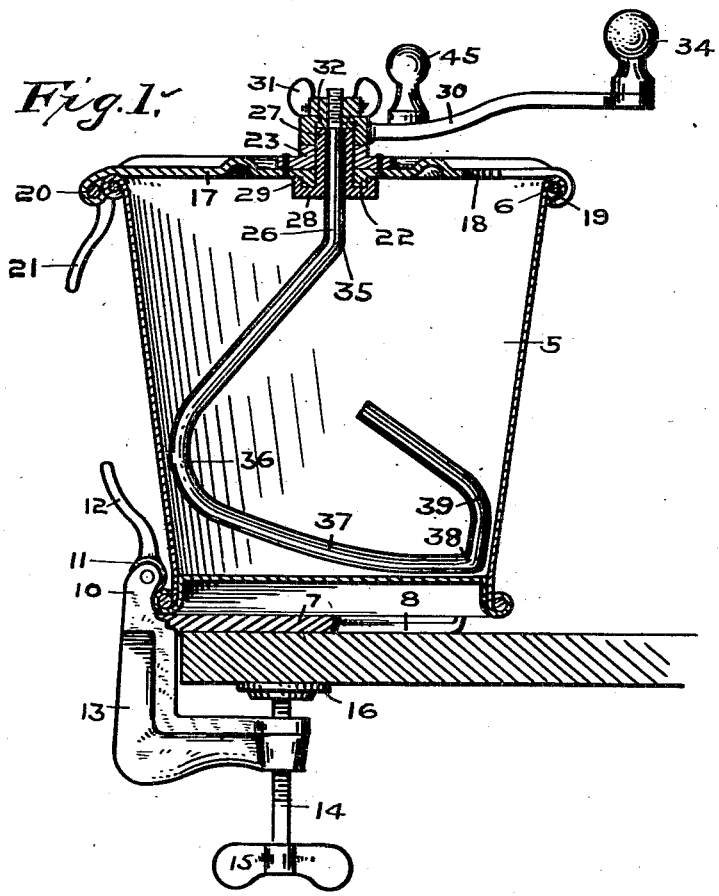
Figure 2:
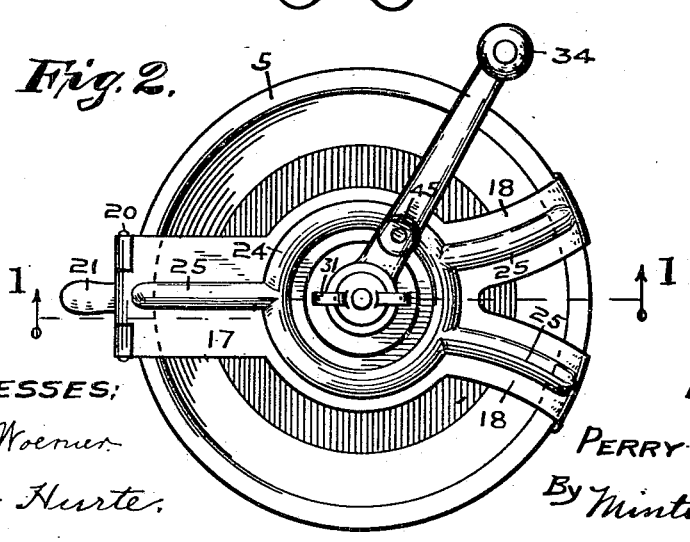

Figure 1 is a vertical central section of my invention on the line 1 1 of Fig. 2. Fig. 2 is a top plan view of same. Fig. 3 is an elevation of my device, showing the side wall broken away in part and some of the parts in vertical section; and Fig. 4 is a perspective view of the removable base for engaging the pail and for clamping the mixing device to a table or other support.

Like characters of reference indicate like parts throughout the several views of the drawings.

5 is a pail, preferably of tin or other sheet metal, circular in cross-section and with the usual slight downward taper. The pail has the wired edges 6 at top and bottom to increase the security of the attachment to the pail of the base-support and support for the mixing-rod.

7 is a base-plate having the two diverging arms 8, which arms terminate with hooks 9 to engage the bottom bead 6 of the pail. The plate has the pair of ears 10, between which the cam 11 is pivotally mounted. The cam 11 has the handle 12, by which it is manipulated. By lowering the handle 12 to position shown in Fig. 3 the cam is turned so the bead on the bottom of the bucket will pass the cam. Then by raising the lever the cam will be moved into clamping position upon the bead. Integral with the plate 7 is the hanger 13, having a horizontal terminal portion with a vertical threaded hole through which the set-screw 14 is screwed. The screw 14 will preferably have the wings 15 at its outer end and the bearing-plate 16 at its inner end and in conjunction with the plate 7 will form a clamp for fastening the apparatus to the table.

Located upon the top of the pail is the plate 17, (see Fig. 2,) having the two diverging arms 18, which terminate with hooks 19 for engagement with the top bead of the pail in the manner shown in Figs. 1 and 3. The opposite end of the plate from said arms is bent down around a pin 20, which supports a cam-lever 21. This cam-lever in raised position permits the hooked arms to be placed in engagement with the rim of the pail and the plate to be placed upon the pail, and when the lever is lowered the cam locks the plate to the pail.

A hole is formed through the plate 17 in line with the vertical axis of the pail, and this hole is surrounded by the depending flange 22, and around said hole on the upper side of the plate is the sleeve 23, having a lateral flange through which the sleeve is riveted to the plate. Formed out of the material of the plate and extending upwardly in a circle around the above-mentioned opening is the rib 24, having the lateral branches 25 extending longitudinally of the plate and each of the diverging arms.

26 is the beater and mixer-rod, which has the fixed sleeve 27 mounted on its upper end. The sleeve 27 makes a close working fit in the opening through the plate 17. It has lateral flange 28 terminating with the upwardly-bent portion 29, together forming a cup-like holder to receive the flange 22 and to catch any drippings of oil or other objectionable matter that might work down through the bearings and drop into the dough mixture. The upper end of the sleeve 27 is squared to receive the crank 30, by means of which the mixer-rod is rotated. A wing-nut 31 is screwed upon the threaded end of the rod 26 to hold the crank in place and also to draw the parts together in a proper working fit.

In order to remove the mixer-rod from the plate 17, it is necessary to screw off the wing-nut 31, and as this removal or separation of the parts is necessary every time the machine is cleaned there is constant danger of the nut getting lost. To prevent this and to make the operations more simple, I construct the nut so it will be inseparable from the crank. This is accomplished by reducing the top part of the opening through the handle, as shown at 32, Figs. 1 and 3, and forming a sleeve on the under side of the nut for insertion through the reduced opening. Then after the sleeve is inserted its end is swaged out to form a lateral flange 33, which prevents the withdrawal of the nut from the crank, while allowing the nut to turn freely in the crank in screwing and unscrewing.

The crank 30 has the knob or handle 34 at its outer end for use when the dough is stiff and a like handle 45 adjacent to the mixer-rod for use when the work is light and a quick movement is desired.

The particular shape of my mixer-rod, as shown in Fig. 1, is important. The rod is bent at an obtuse angle 35 and extends thence in an oblique downward direction nearly to the side wall of the pail and to or a little below the middle depth of the pail. Then it is bent on a curve 36 and extends downwardly and laterally of the oblique portion in a part 37, curved on a longer radius to the bottom corner of the pail, where it is bent upwardly, this time at substantially a right angle 38, and extends parallel with the side of the pail and in close relation to said side for a short distance. It is finally bent on a curve 39 and extends in a straight portion oblique to the vertical and upwardly to near the center of the pail, where it terminates at a sufficient distance from the opposite oblique member to permit the mixed dough to be easily stripped off over this free end.

All parts of the mixer-rod lie substantially in the same vertical plane, and the rod is given the shape here described in order that its parts will traverse substantially all parts of the pail's interior and thoroughly stir and mix the ingredients placed within the pail. The lower angular bend 38 enters the bottom corner of the pail and prevents the accumulation therein of unmixed portions.

Having thus fully described my invention, what I claim as new, and wish to secure by Letters Patent, is—

1. In a bread-mixer, a pail, a mixing-rod having a vertical top portion which merges into a downward oblique portion, said oblique portion merging into a curved bend adjacent to the side of the pail, and thence into a part which extends across the pail and is formed with an upward angular bend at the lower corner of the pail, said rod extending thence upwardly adjacent to the side of the pail and thence in an oblique upward direction toward the middle of the pail, and means for rotating the rod.

2. In a bread-mixer, a pail, a mixing-rod having a vertical top portion and a portion extending downwardly therefrom to near the side of the pail above the bottom of the pail and thence across the pail to the lower corner thereof, thence upwardly adjacent to that side of the pail and thence obliquely toward the middle of the pail, and means for rotating the rod.

3. In a bread-mixer, a pail, a plate across the top of the pail, a mixing-rod passing through an opening in the plate and having its lower end bent to do the mixing when the rod is rotated, a fixed sleeve on the rod having a lateral flange operating against the under side of the plate, said sleeve passing through the plate and having its upper end squared to receive a crank, a crank on said squared end of the sleeve and a nut on the threaded upper end of the rod to draw the parts together and secure them against removal.

4. In a bread-mixer, a pail, a plate across the top of the pail having an opening over the middle of the pail with an under side flange around said opening, a mixing-rod passing through said opening said rod having its lower end bent to do the mixing when the rod is rotated, a flange extending laterally of the rod having an upwardly-directed marginal portion forming an annular receptacle to receive said flange on the plate, a crank on the rod above the plate and means for clamping the plate between the crank and flange on the rod.

5. In a bread-mixer, a pail, a plate across the top of the pail having a hole centrally of the pail, a mixing-rod having a straight part passing through the hole said rod being bent downwardly and laterally and continued to near the side of the pail and then bent downwardly and in opposite lateral direction and continued to the opposite lower corner of the pail and then bent upwardly and continued parallel with the side of the pail and then bent inwardly and upwardly and terminating near the middle of the pail, a sleeve fixed to the rod where it passes through the plate said sleeve having a flange adjacent to the under side of the plate with an upper channel to receive a flange on the under side of the plate, a crank on the squared upper end of said sleeve and a nut on the threaded end of the rod to draw the parts together and retain them.

6. In a bread-mixer, a pail, a plate crossing the top of the pail having an opening at the middle of the pail, a bent mixing-rod having a straight portion passing vertically through the opening in the plate a crank above the plate to rotate the rod, a nut on the threaded end of the rod to retain the crank, and means for uniting the nut and crank whereby the two are inseparable but the nut is revoluble independently of the movement of the crank.

7. In a bread-mixer, a pail, a plate crossing the top of the pail having an opening at the middle of the pail, a mixing-rod passing through the hole in the plate said rod having a flange under the plate, a crank above the plate to rotate the rod said crank having a hole for the rod to pass through said opening having an inside flange at its top, and a nut screwing on the threaded end of the rod said nut having an under flange which is swaged out after passing through the flange in the crank to keep the nut and crank from being separated.

8. In a bread-mixer, a pail having top and bottom beaded edges, a plate crossing the top and another plate crossing the bottom of the pail the top plate being for the support and attachment of a mixer-rod and the bottom plate being for the support and attachment of the pail, both top and bottom plates having diverging arms at one end terminating with hooks to engage the respective beads on the edges of the pails, clamping-levers mounted on the opposite ends of each of said plates adapted to engage the said beads and lock the respective plates to the pail, a clamp extension from the lower plate for attachment of the pail and plate to a table and a mixer-rod passing through the top plate and supported thereby.

In witness whereof I have hereunto set my hand and seal, at Indianapolis, Indiana, this 30th day of September, A. D. 1905.

PERRY C. SMITH. [L. S.]

Witnesses:
JOSEPH A. MINTURN,
F. W. WOERNER.